United States Patent
Song et al.

(10) Patent No.: US 9,826,484 B2
(45) Date of Patent: *Nov. 21, 2017

(54) APPARATUS AND METHOD FOR REDUCING POWER CONSUMPTION IN PORTABLE TERMINAL

(71) Applicant: SAMSUNG ELECTRONICS CO., LTD., Suwon-si (KR)

(72) Inventors: Hee-Jun Song, Yongin-si (KR); Kwang-Choon Kim, Suwon-si (KR); Nam-Woo Kim, Hanam-si (KR); Sung Kwon, Gunpo-si (KR); Yu-Jin Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/346,218

(22) Filed: Nov. 8, 2016

(65) Prior Publication Data

US 2017/0055220 A1    Feb. 23, 2017

Related U.S. Application Data

(63) Continuation of application No. 14/829,194, filed on Aug. 18, 2015, which is a continuation of application
(Continued)

(30) Foreign Application Priority Data

Sep. 16, 2009   (KR) .................. 10-2009-0087422
May 3, 2010    (KR) .................. 10-2010-0041395

(51) Int. Cl.
   *H04L 1/00*    (2006.01)
   *H04W 52/02*   (2009.01)
(Continued)

(52) U.S. Cl.
   CPC ......... *H04W 52/0254* (2013.01); *H04L 67/22* (2013.01); *H04W 52/028* (2013.01);
(Continued)

(58) Field of Classification Search
   CPC ........ H04B 17/00; H04B 3/46; H04B 7/2121; H04B 7/2123; H04L 43/00; H04L 43/50;
(Continued)

(56) References Cited

U.S. PATENT DOCUMENTS 6,011,546 A    1/2000  Bertram
6,289,464 B1   9/2001  Wecker et al.
(Continued)

FOREIGN PATENT DOCUMENTS

CN    1877696 A    12/2006
CN    101095055    12/2007
(Continued)

OTHER PUBLICATIONS

Notice of Allowance and Fee(s) Due dated Sep. 23, 2016 issued in U.S. Appl. No. 14/930,564.
(Continued)

*Primary Examiner* — Dady Chery
(74) *Attorney, Agent, or Firm* — Sughrue Mion, PLLC

(57) ABSTRACT

An apparatus and method for reducing power consumption of a portable terminal are provided. More particularly, an apparatus and method for reducing power consumption generated in an idle state in order to solve a power consumption problem in a portable terminal are provided. The apparatus includes a state determination unit which is configured independently from an application processor for controlling applications and which wakes up when entering an idle mode to allow the application processor to sleep, and thereafter determines a state of the portable terminal, and if
(Continued)

it is determined that the portable terminal escapes from the idle mode, allows the application processor to wake up.

18 Claims, 7 Drawing Sheets

Related U.S. Application Data

No. 13/496,863, filed as application No. PCT/KR2010/006343 on Sep. 16, 2010, now Pat. No. 9,167,527.

(51) Int. Cl.
  *H04L 29/08* (2006.01)
  *H04W 88/02* (2009.01)
(52) U.S. Cl.
  CPC ........ *H04W 52/0251* (2013.01); *H04W 88/02* (2013.01); *Y02B 60/50* (2013.01)
(58) Field of Classification Search
  CPC ....... H04L 41/04; H04L 41/085; H04L 41/12; H04L 45/02; H04W 24/00; H04W 84/18; H04W 72/04; H04W 72/12; H04W 76/00; H04J 2203/0069; H04Q 2213/394
  USPC ........ 370/230, 229, 311, 313; 455/572, 574, 455/343.1, 343.4
  See application file for complete search history.

(56) References Cited

U.S. PATENT DOCUMENTS

| | | | |
|---|---|---|---|
| 7,482,907 | B2 | 1/2009 | Denison et al. |
| 9,485,735 | B2 | 11/2016 | Song et al. |
| 2004/0181703 | A1 | 9/2004 | Lilja et al. |
| 2004/0203838 | A1 | 10/2004 | Joshi et al. |
| 2006/0161377 | A1 | 7/2006 | Rakkola et al. |
| 2006/0276919 | A1 | 12/2006 | Shirai et al. |
| 2007/0051872 | A1 | 3/2007 | Goldberg et al. |
| 2008/0028404 | A1 | 1/2008 | Oh et al. |
| 2008/0051154 | A1 | 2/2008 | Schlomann et al. |
| 2008/0070603 | A1 | 3/2008 | Mao |
| 2008/0178013 | A1 | 7/2008 | Kim et al. |
| 2009/0163226 | A1 | 6/2009 | Karkaria et al. |
| 2009/0164813 | A1 | 6/2009 | Tu et al. |
| 2009/0184849 | A1 | 7/2009 | Nasiri et al. |
| 2009/0259865 | A1* | 10/2009 | Sheynblat ............. G06F 1/3203 713/323 |
| 2010/0013778 | A1 | 1/2010 | Liu et al. |
| 2010/0161720 | A1 | 6/2010 | Colligan et al. |
| 2010/0214216 | A1 | 8/2010 | Nasiri et al. |
| 2010/0235667 | A1 | 9/2010 | Mucignat et al. |
| 2010/0302028 | A1 | 12/2010 | Desai et al. |
| 2011/0003621 | A1 | 1/2011 | Atsumi |
| 2015/0234481 | A1 | 8/2015 | Nasiri et al. |

FOREIGN PATENT DOCUMENTS

| | | |
|---|---|---|
| CN | 101115257 | 1/2008 |
| CN | 101502050 | 8/2009 |
| EP | 2073098 A2 | 6/2009 |
| JP | 2009153123 A | 7/2009 |
| KR | 10-2005-0023822 | 3/2005 |
| KR | 10-2006-0019040 | 3/2006 |
| KR | 10-2006-0122425 | 11/2006 |
| WO | 2009/110636 A1 | 9/2009 |

OTHER PUBLICATIONS

Communication dated Jun. 27, 2016, issued by the United States Patent and Trademark Office in counterpart U.S. Appl. No. 14/930,564.
Communication dated Aug. 15, 2016, issued by the State Intellectual Property Office in counterpart Chinese Application No. 201080041008.2.
Communication dated Sep. 7, 2016, issued by the Korean Intellectual Property Office in counterpart Korean Application No. 10-2016-0062272.
Communication dated Jan. 15, 2016 issued by the State Intellectual Property Office of P.R. of China in counterpart Chinese Patent Application No. 2010800410082.
Communication dated Feb. 17, 2016 issued by European Patent Office in counterpart European Patent Application No. 10817420.2.
Communication dated Feb. 22, 2016 issued by Korean Intellectual Property Office in counterpart Korean Patent Application No. 10-2010-0041395.
Communication dated Feb. 3, 2016 issued by United States Patent and Trademark Office in counterpart U.S. Appl. No. 14/930,564.
Korean Office Action dated Sep. 1, 2015 in connection with Korean Patent Application No. 10-2010-0041395, 13 pages.
International Search Report dated May 9, 2011 in connection with International Patent Application No. PCT/KR2010/006343.
Written Opinion of International Searching Authority dated May 9, 2011 in connection with International Patent Application No. PCT/KR2010/006343.
Chinese Office Action dated Apr. 3, 2014 in connection with Chinese Patent Application No. 2010800410082, 11 pages.
Chinese Office Action dated Jun. 24, 2015 in connection with Chinese Patent Application No. 2010800410082, 11 pages.
Communication dated Feb. 28, 2017, issued by the United States Patent and Trademark Office in counterpart U.S. Appl. No. 14/829,194.
Communication dated Mar. 24, 2017, issued by the United States Patent and Trademark Office in counterpart U.S. Appl. No. 15/285,525.
Communication from United States Patent and Trademark Office issued Nov. 30, 2016, in U.S. Appl. No. 15/285,525.
Communication dated Jan. 5, 2017, issued by the Korean Intellectual Property Office in corresponding Korean Application No. 10-2016-0062272.

\* cited by examiner

[Fig. 1]
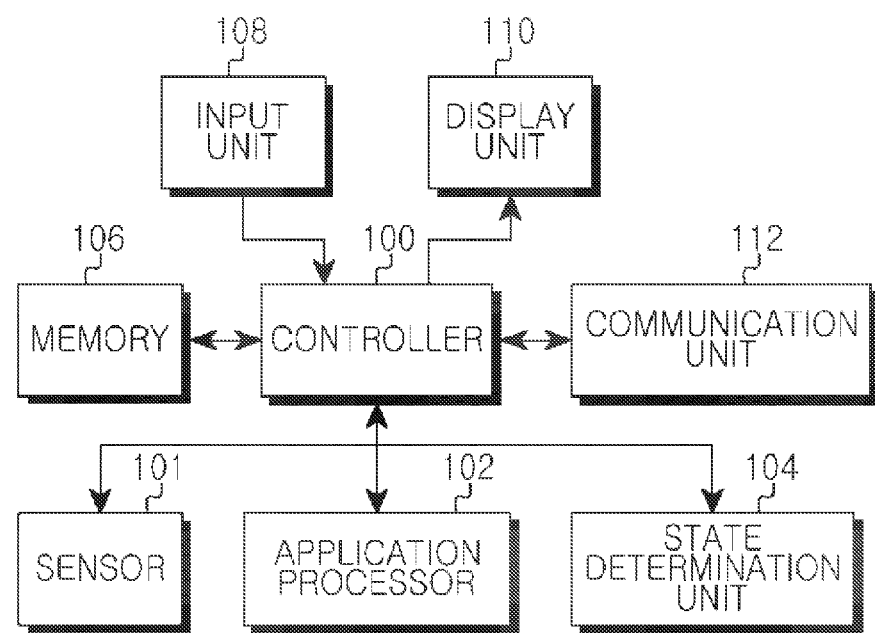

[Fig. 2]
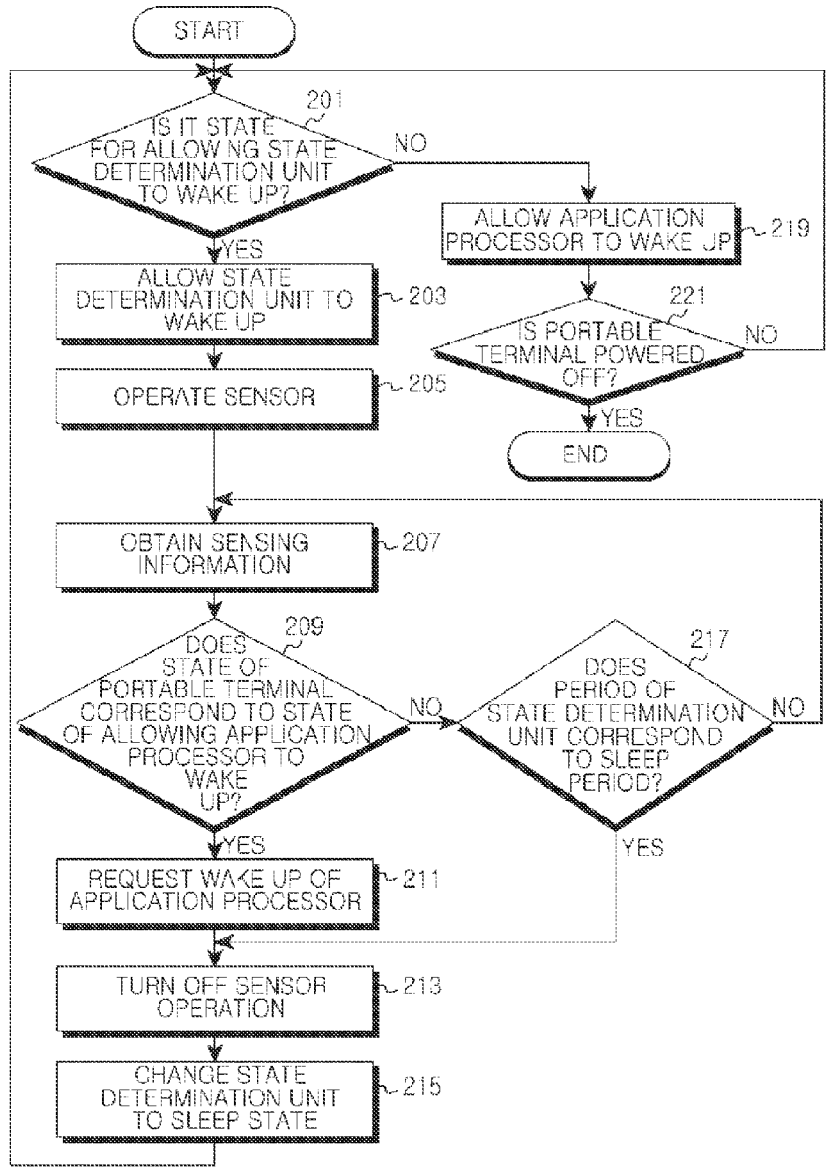

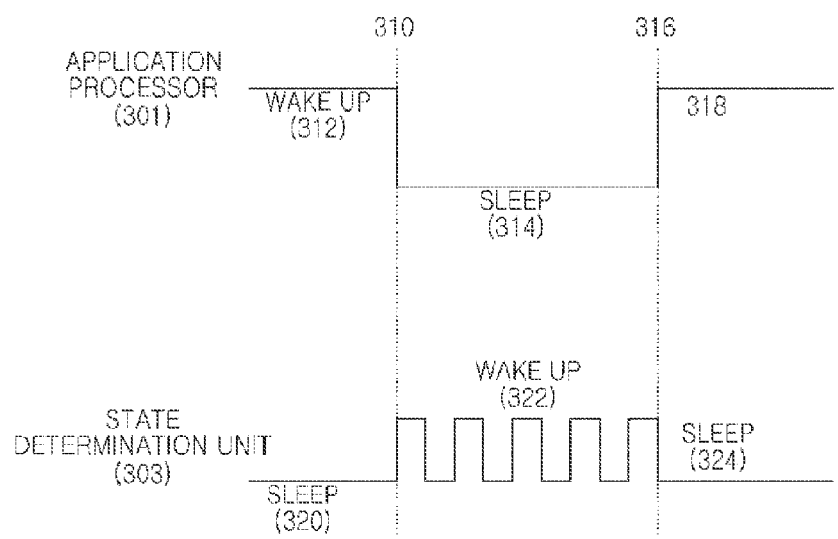

[Fig. 4]
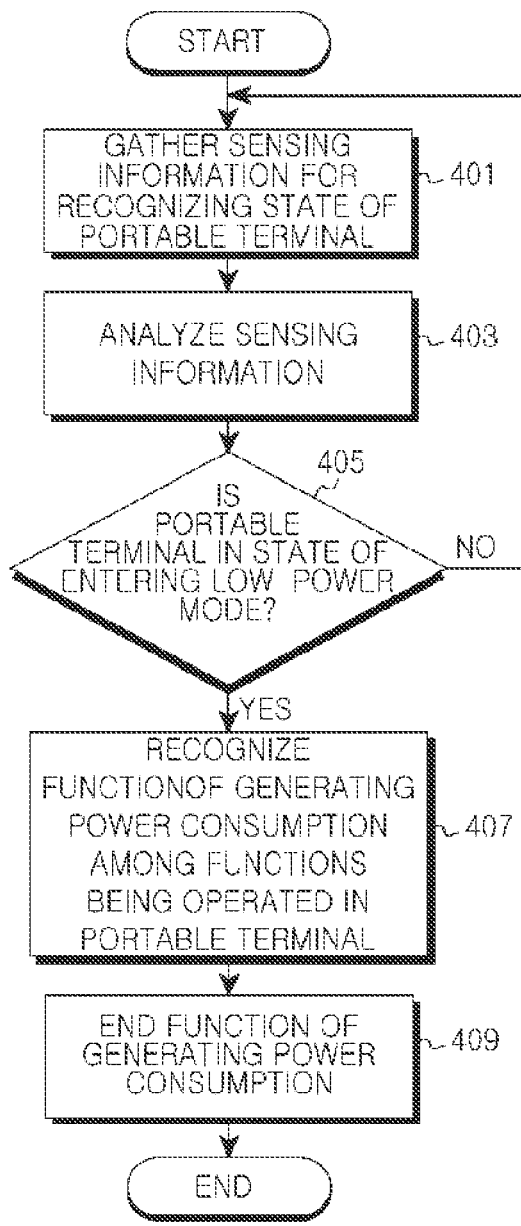

[Fig. 5]
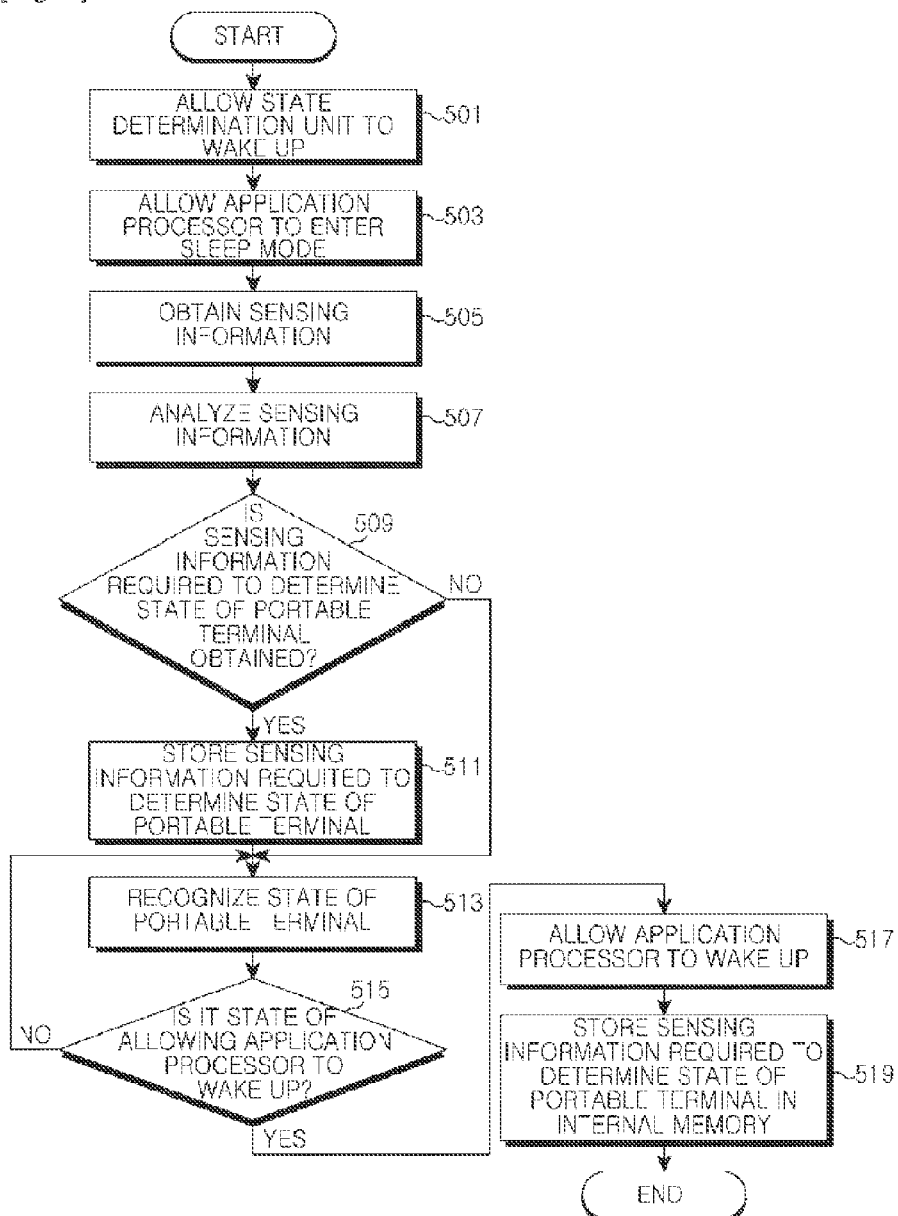

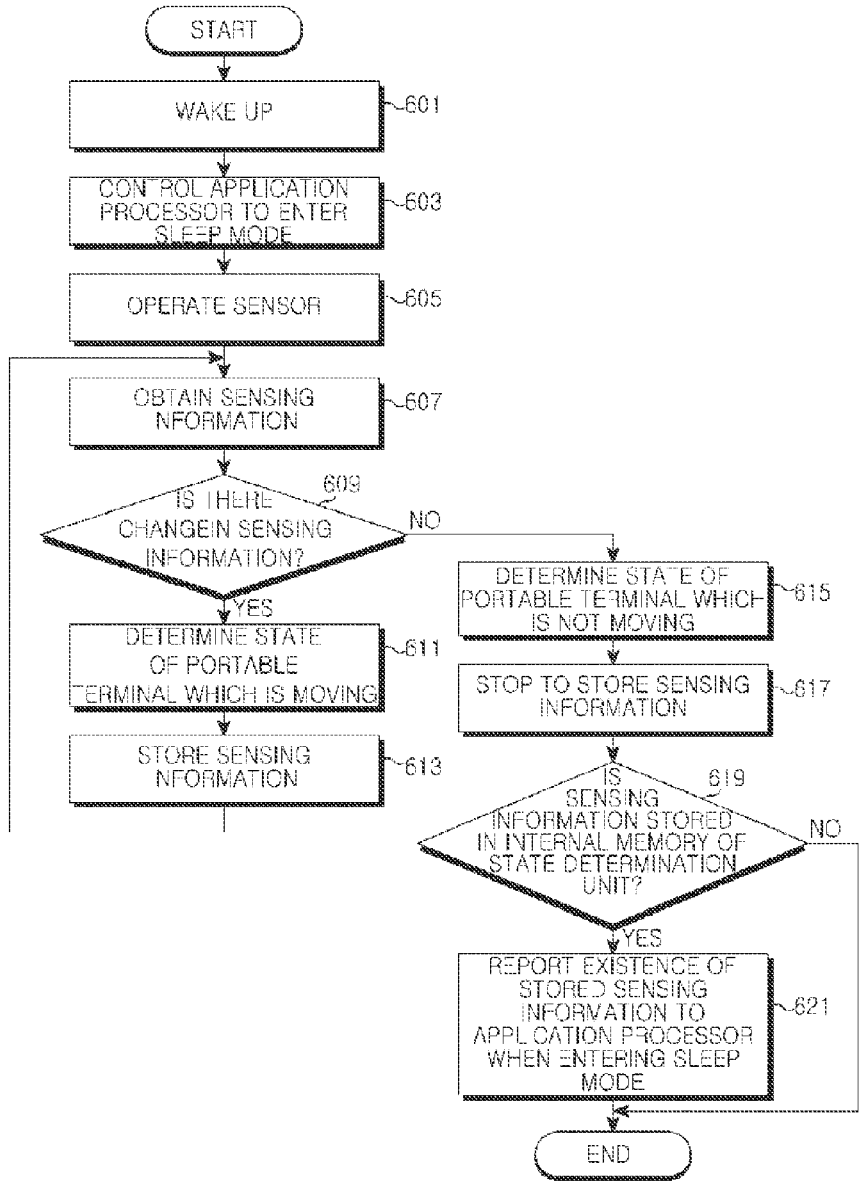
[Fig. 6]

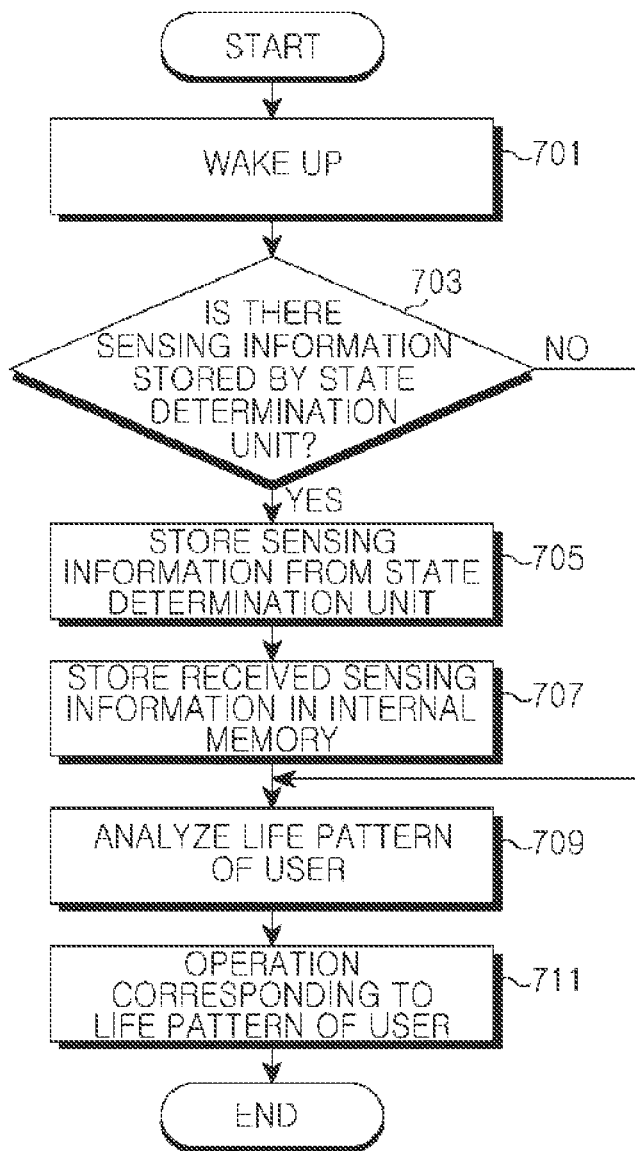

APPARATUS AND METHOD FOR REDUCING POWER CONSUMPTION IN PORTABLE TERMINAL

The present application is a continuation of U.S. patent application Ser. No. 14/829,194, filed Aug. 18, 2015, which is a continuation of U.S. patent application Ser. No. 13/496,863, filed on Mar. 16, 2012, now U.S. Pat. No. 9,167,527, issued Oct. 20, 2015, which is a National Stage Entry of International Patent Application No. PCT/KR2010/006343 filed Sep. 16, 2010, which claims priority from Korean Patent Application No. 10-2010-0041395, filed May 3, 2010, and Korean Patent Application No. 10-2009-0087422, filed Sep. 16, 2009, in the Korean Intellectual Property Office, the disclosures of which are incorporated herein in their entirety by reference.

TECHNICAL FIELD

The present invention relates to an apparatus and method for reducing power consumption in a portable terminal. More particularly, the present invention relates to an apparatus and method for reducing power consumption generated in an idle state in order to solve a power consumption problem in a portable terminal.

BACKGROUND ART

Recently, with the rapid development of portable terminals, a mobile terminal providing wireless voice calls and data exchanges is regarded as personal necessity of life. Conventional portable terminals have generally been regarded as portable devices providing wireless calls. However, along with technical advances and introduction of the wireless Internet, portable terminals are now used for many purposes in addition to telephone calls. For example, the portable terminal provides a variety of functions to satisfy users' demands, such as, games, watching a satellite broadcasting program, remote controlling using near field communication, capturing images using a built-in digital camera, schedule management, and the like.

For the use of such a portable terminal, a longer time is required to use an additional function than a time of using wireless calls.

The development of batteries is not significant in comparison with the rapid development of the portable terminal. However, due to portability of the portable terminal, a required battery size is decreased, which results in the limitation of battery capacity.

In order to support more functions of the portable terminal with the limited battery capacity, power consumption of the portable terminal has to be reduced in addition to the increase of the battery capacity.

Among the functions of the portable terminal, battery consumption is great when listening to music, watching videos, operating a camera, emitting backlight, etc. Recently, portable terminals employ various sensors and functional modules for implementing a plurality of applications and functions. Accordingly, there is a problem in that power consumption is greater than a case of using the conventional terminals based on wireless communications.

In order to solve the aforementioned problem, the portable terminal intends to reduce power consumption by using the plurality of sensors included therein.

For example, the portable terminal uses the sensor to determine a time for using a Radio Frequency (RF) module so as to supply power at that time. Alternatively, the portable terminal escapes from an idle state at a time of determining a state in which the portable terminal will be used by a user such as an operation of gripping the portable terminal.

The portable terminal can reduce power consumption of the portable terminal. However, in order to determine a state of the portable terminal and a time for supplying power, the portable terminal has to obtain sensing information by periodically allowing a controller (i.e., an application processor) to wake up from an idle state.

That is, the aforementioned method has a problem in that power consumption occurs even in the idle state to perform a process of obtaining the sensing information to determine the state of the portable terminal and the time for supplying power.

DISCLOSURE OF INVENTION

Solution to Problem

An aspect of the present invention is to solve at least the above-mentioned problems and/or disadvantages and to provide at least the advantages described below. Accordingly, an aspect of the present invention is to provide an apparatus and method for solving a power consumption problem of a portable terminal.

Another aspect of the present invention is to provide an apparatus and method for reducing power consumption generated in an idle state of a portable terminal.

Another aspect of the present invention is to provide an apparatus and method for controlling operations of sensors to determine a state of a portable terminal when a portable terminal remains in an idle state.

Another aspect of the present invention is to provide an apparatus and method for determining a life pattern of a user of a portable terminal when the portable terminal remains in an idle state.

In accordance with an aspect of the present invention, an apparatus for reducing power consumption in a portable terminal is provided. The apparatus includes a state determination unit which is configured independently from an application processor for controlling applications and which wakes up when entering an idle mode to allow the application processor to sleep, and thereafter determines a state of the portable terminal, and if it is determined that the portable terminal escapes from the idle mode, allows the application processor to wake up.

In accordance with another aspect of the present invention, a method of reducing power consumption in a portable terminal is provided. The method includes determining a state of the portable terminal after allowing a state determination unit which is configured independently from an application processor for controlling applications to wake up when entering an idle mode and allowing the application processor to sleep, and if it is determined that the portable terminal escapes from the idle mode, allowing the application processor to wake up.

BRIEF DESCRIPTION OF DRAWINGS

The above and other aspects, features and advantages of certain exemplary embodiments of the present invention will be more apparent from the following detailed description taken in conjunction with the accompanying drawings, in which:

FIG. 1 is a block diagram illustrating a structure of a portable terminal for reducing power consumption according to an exemplary embodiment of the present invention;

FIG. 2 is a flowchart illustrating a process of waking up from an idle state in order to reduce power consumption in a potable terminal according to an exemplary embodiment of the present invention;

FIG. 3 illustrates a process of performing an operation for reducing power consumption in a portable terminal according to an exemplary embodiment of the present invention;

FIG. 4 is a flowchart illustrating a process of reducing power consumption of a portable terminal according to another exemplary embodiment of the present invention;

FIG. 5 is a flowchart illustrating a process of obtaining sensing information required to determine a state (or a life pattern of a user) of a portable terminal according to another exemplary embodiment of the present invention;

FIG. 6 is a flowchart illustrating a process of obtaining sensing information required to determine a state (or a life pattern of a user) of a portable terminal by a state determination unit according to another exemplary embodiment of the present invention; and FIG. 7 is a flowchart illustrating a process of determining a state (or a life pattern of a user) of a portable terminal by an application processor according to another exemplary embodiment of the present invention.

Throughout the drawings, like reference numerals will be understood to refer to like parts, components and structures.

BEST MODE FOR CARRYING OUT THE INVENTION

Exemplary embodiments of the present invention will be described below with reference to the accompanying drawings. In the following description, well-known functions or constructions are not described in detail since they would obscure the invention in unnecessary detail.

The present invention described below relates to an apparatus and method for reducing power consumption generated in an idle state in order to solve a power consumption problem in a portable terminal.

FIG. 1 is a block diagram illustrating a structure of a portable terminal for reducing power consumption according to an exemplary embodiment of the present invention.

Referring to FIG. 1, the portable terminal includes a controller 100, a sensor 101, an application processor 102, a state determination unit 104, a memory 106, an input unit 108, a display unit 110, and a communication unit 112. An operation of the application processor 102 of the portable terminal may be processed by the controller 100. The portable terminal may include additional units. Similarly, the functionality of two or more of the above units may be integrated into a single component.

The controller 100 of the portable terminal provides overall control to the portable terminal. For example, the controller 100 processes and controls voice calls and data communications, and in addition to its typical function, the controller 100 of the present invention provides control such that power consumption generated in an idle state is reduced to solve the power consumption problem of the portable terminal.

More particularly, when the portable terminal remains in the idle state, the controller 100 controls the application processor 102 in an wake-up state to transition to a sleep state, and thereafter controls the state determination unit 104 to determine a state of the portable terminal. Accordingly, the state determination unit 104 in the idle state wakes up in order to control the sensor 101 and thus can determine the state of the portable terminal.

Further, according to another exemplary embodiment of the present invention, if the portable terminal remains in a state for entering a low-power mode such as an idle mode, the controller 100 provides control such that power consumption is reduced by ending an operation of functions except for a minimum function for call reception among operations being performed previously.

In addition thereto, according to another exemplary embodiment of the present invention, sensing information can be obtained under the control of the controller 100. The sensing information is required to determine a state (or a life pattern of a user) of the portable terminal in a state in which the portable terminal enters the low-power mode. More particularly, the controller 100 controls the woken-up application processor 102 to analyze the life pattern of the user of the portable terminal by using the obtained sensing information (i.e., sensing information obtained by the control of the state determination unit 104). Herein, examples of the life pattern of the user of the portable terminal include a commuting pattern indicating a route on which the user of the portable terminal frequently use to commute, a pattern of using public transportations, etc.

That is, under the control of the controller 100, the application processor 102 transitions to the sleep state, and thereafter the state determination unit 104 stores sensing information having a great variable value. When the application processor 102 enters a wake-up state afterwards, the life pattern of the user of the portable terminal is determined by using the stored sensing information. Accordingly, by using the life pattern of the user of the portable terminal, the controller 100 can perform an operation of reporting a remaining time up to the arrival of a working place, and when the portable terminal is located near home, can perform operations corresponding to respective patterns such as garage door opening.

The sensor 101 consists of sensors (i.e., an acceleration sensor, a gyro sensor, a terrestrial magnetism sensor, a proximity sensor, an ambient light sensor, etc.). According to the present invention, the sensor 101 obtains sensing information by using the sensors under the control of the state determination unit 104.

The application processor 102 is an element for processing an overall operation of the portable terminal similarly to the controller 100. When the portable terminal remains in the idle state according to the present invention, the application processor 102 transitions to the sleep state, and when the state of the portable terminal is not in the idle state (i.e., when the portable terminal is in a standby state), the application processor 102 transitions to the wake-up state and controls an operation of the portable terminal. The operation of the application processor 102 can be processed by the controller 100.

The state determination unit 104 controls the sensor 101 to obtain the sensing information for determining the state of the portable terminal, and determines the state of the portable terminal by using the sensing information obtained by the sensor 101.

In this case, the state determination unit 104 wakes up at a time when the state of the portable terminal transitions to the idle state and thus allows the application processor 102 remaining in the wake-up state to the sleep state, and thereafter controls the sensor 101. When it is determined that the portable terminal escapes from the idle mode by using the sensing information obtained by the sensor 101, the state determination unit 104 turns off the operation of the sensor 101 to reduce power consumption, and thereafter allows the application processor 102 remaining in the sleep state to wake up.

Further, the state determination unit 104 is an element implemented separately from the application processor 102, and can be constructed with a cheap micro computer and can determine the state of the portable terminal irrespective of the operation of the application processor 102. According to another exemplary embodiment of the present invention, the state determination unit 104 includes an internal memory to store the sensing information required to determine the state of the portable terminal.

Accordingly, the state determination unit 104 can determine and store the sensing information that can be used to analyze the life pattern of the user of the portable terminal.

The memory 106 of the portable terminal includes a Read Only Memory (ROM), a Random Access Memory (RAM), a flash ROM, and the like. The ROM stores a microcode of a program, by which the controller 100, the application processor 102, and the state determination unit 104 are processed and controlled, and a variety of reference data.

The RAM is a working memory of the controller 100 and stores temporary data that is generated while programs are performed. The flash ROM stores a variety of rewritable data, such as phonebook entries, outgoing messages, incoming messages, and a variety of rewritable data such as information of the touch input point of the user.

The input unit 108 includes a plurality of function keys such as numeral key buttons of '0' to '9', a menu button, a cancel button, an OK button, a talk button, an end button, an Internet access button, a navigation key button, and a character input key, and the like. Key input data, which is input when the user presses these keys, is provided to the controller 100. These keys are merely examples of keys which may make up the input unit 108; the input unit may include additional or different keys, or different input mechanisms through which the user supplies input to the portable terminal.

The display unit 110 displays information such as state information, which is generated while the portable terminal operates, limited numeric characters, large volumes of moving and still pictures, and the like. The display unit 110 may be a color Liquid Crystal Display (LCD), an Active Mode Organic Light Emitting Diode (AMOLED), and the like. The display unit 110 may include a touch input device as an input device when using a touch input type portable terminal.

The communication unit 112 transmits and receives a Radio Frequency (RF) signal of data that is input and output through an antenna (not illustrated). For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data.

Although the functions of the application processor 102 can be performed by the controller 100 of the portable terminal, these elements are separately constructed in the present invention for exemplary purposes only. Thus, those ordinary skilled in the art can understand that various modifications can be made within the scope of the present invention. For example, these elements may be constructed such that their functions are processed by the controller 100.

An apparatus for reducing power consumption generated in an idle state in order to solve a power consumption problem in a portable terminal has been described above. Hereinafter, a method of reducing power consumption of the portable terminal by reducing power consumption generated in the idle state will be described by using the apparatus according to an exemplary embodiment of the present invention.

FIG. 2 is a flowchart illustrating a process of waking up from an idle state in order to reduce power consumption in a potable terminal according to an exemplary embodiment of the present invention.

Referring to FIG. 2, the portable terminal determines whether a state of the portable terminal is a state for allowing the state determination unit 104 to wake up in step 201. Herein, the state for allowing the state determination unit 104 to wake up implies a state in which the state of the controller 100 or the application processor 102 of the portable terminal transitions to a sleep state, which implies a case where the portable terminal transitions to an idle state so that the state determination unit 104 transitions from the sleep state to a wake-up state.

If it is determined in step 201 that the state of the portable terminal is the state for allowing the state determination unit 104 to wake up, proceeding to step 203, the portable terminal allows the state determination unit 104 to wake up. Herein, the state determination unit 104 is an element for controlling an operation of a sensor included in the portable terminal, and can be constructed with a cheap micro computer independent from the controller 100 of the portable terminal so that the portable terminal can operate in the idle state.

Thereafter, the portable terminal operates the sensor 101 in step 205, and obtains sensing information from the sensor 101 in step 207. The sensor 101 may include a plurality of sensors, and can operate under the control of the state determination unit 104.

In step 209, the portable terminal performs a process of determining the state of the portable terminal by using the sensing information received from the sensor 101. In this case, this process is performed to determine whether the portable terminal remains in the idle state or escapes from the idle state.

If the determination result of step 209 shows that the state of the portable terminal corresponds to a state of allowing the application processor 102 to wake up (i.e., in a state of being escaped from the idle mode), proceeding to step 211, the portable terminal requests the wake up of the application processor 102.

In step 213, the portable terminal turns off the operation of the sensor being operated. In step 215, the portable terminal changes the state determination unit 104 from the wake-up state to the sleep state.

This is to reduce power consumption generated when the application processor 102 wakes up periodically in the conventional portable terminal to determine the state of the portable terminal. According to the present invention, the portable terminal separately uses the state determination unit 104 such as a cheap micro computer which uses low power in the idle state, so as to obtain sensing information for determining the state of the portable terminal.

Otherwise, if the determination result of step 209 shows that the state of the portable terminal is not the state of waking up the application processor 102 (i.e., when it is determined that the portable terminal remains in the idle state), proceeding to step 217, the portable terminal determines whether a period of the state determination unit 104 is a sleep period. Herein, the portable terminal allows the state determination unit 104 to periodically transition between the wake-up state and the sleep state with an interval of a specific period even in the idle state so as to reduce power consumption generated by the operation of the state determination unit 104.

If it is determined in step 217 that the period of the state determination unit 104 is a wake-up period, step 207 is repeated.

Otherwise, if it is determined in step 217 that the period of the state determination unit 104 is the sleep period, proceeding to step 213, the portable terminal turns off the operation of the sensor currently being operating.

This is to effectively avoid power consumption by allowing the state determination unit 104 to operate alternately between the wake-up state and the sleep state with a specific period, instead of allowing the state determination unit 104 to persistently operate in the idle state.

The aforementioned operation can be persistently performed while the portable terminal operates, so that the application processor 102 can wake up or sleep according to the state of the portable terminal.

Accordingly, if it is determine in step 201 that the state of the portable terminal is not in the state of allowing the state determination unit 104 to wake up, proceeding to step 219, the portable terminal allows the application processor 102 to wake up, proceeding to step 221, the portable terminal determines whether the portable terminal is powered on.

If it is determined in step 221 that the portable terminal is not powered on, returning to step 201, the subsequent steps are repeated.

Otherwise, if it is determined in step 221 that the portable terminal is powered off, the procedure of FIG. 2 ends.

FIG. 3 illustrates a process of performing an operation for reducing power consumption in a portable terminal according to an exemplary embodiment of the present invention.

Referring to FIG. 3, the portable terminal includes a state determination unit 303 in addition to an application processor 301 for determining a state of the portable terminal in order to reduce power consumption when performing a process of allowing the portable terminal to wake up in an idle state.

When in the idle state, the portable terminal allows only the state determination unit 303 to determine the state of the portable terminal.

More specifically, when the application processor 301 remains in a wake-up state 312, the portable terminal switches a state of the state determination unit 303 to a sleep state 320, and when the application processor 301 is switched to a sleep state 314 in a specific time (or period) 310, the portable terminal switches the state of the state determination unit 303 in the sleep state 320 into a wake-up state 322 so that the state of the portable terminal is determined by using low power.

In this case, the state determination unit 303 switched to the wake-up state periodically transitions between the wake-up state and the sleep state while the application processor 301 remains in the sleep state 314, so as to reduce power consumption generated by the operation of the state determination unit 303. The state determination unit 303 in the wake-up state 322 obtains sensing information by allowing operations of sensors, and thereafter determines the state of the portable terminal.

On the contrary, when the state determination unit 303 in the wake-up state 322 transitions to the sleep state, power consumption of the portable terminal can be reduced by turning off operations of sensors currently being operating.

In addition thereto, the state determination unit 303 can allow the application processor 301 to transition to a wake up state 318 at a time 316 in which the portable terminal escapes from the idle state by using sensing information obtained by the sensors currently being operating, and thereafter can allow the portable terminal to transitions to a sleep state 324.

FIG. 4 is a flowchart illustrating a process of reducing power consumption of a portable terminal according to another exemplary embodiment of the present invention.

Referring to FIG. 4, the portable terminal gathers sensing information for recognizing a state of the portable terminal in step 401, and then proceeding to step 403, analyzes the sensing information gathered in step 401 in order to recognize the state of the portable terminal. Thereafter, proceeding to step 405, the portable terminal determines whether it is a state in which the portable terminal enters a low-power mode. Herein, the state of entering the low-power mode is a state in which power consumption can be reduced by limiting unnecessary power usage since the portable terminal does not actually operate. An example of this state includes a state in which the portable terminal is located in a pocket of a user, a state in which the portable terminal is turned over, a state in which the portable terminal does not operate for a specific time period, and a state in which the portable terminal enters in the idle mode, etc.

If it is determined in step 405 that the state of the portable terminal is not the state of entering to the low-power mode, for example, if the user of the portable terminal persistently operates the portable terminal, step 401 is repeated.

Otherwise, if it is determined in step 405 that the state of the portable terminal is the state of entering to the low-power mode, proceeding to step 407, the portable terminal recognizes a function of generating power consumption among functions being operated in the portable terminal. Thereafter, proceeding to step 409, the portable terminal ends the function of generating power consumption to reduce power consumption generated in the portable terminal.

In this case, the portable terminal can end functions sequentially starting from a function of which power consumption is most severe, or can end the functions except for a minimum function for call reception.

For example, when the portable terminal enters the idle mode, the portable terminal can end functions being operated, such as, a music playback program, a schedule manager program, a screen illumination, etc., in order to reduce power consumption.

Thereafter, the procedure of FIG. 4 ends.

FIG. 5 is a flowchart illustrating a process of obtaining sensing information required to determine a state (or a life pattern of a user) of a portable terminal according to another exemplary embodiment of the present invention.

Referring to FIG. 5, the portable terminal allows the state determination unit 104 to wake up in step 501, and then proceeding to step 503, allows the application processor 102 to enter a sleep mode. As such, a situation where the state determination unit 104 wakes up and the application processor 102 enters the sleep mode implies a situation where the portable terminal transitions to an idle state.

In step 505, the portable terminal allows the state determination unit 104 in the wake-up state to obtain sensing information by operating the sensor 101. In step 507, the portable terminal allows the state determination unit 104 to analyze the obtained sensing information.

Herein, the portable terminal allows the state determination unit 104 to analyze a change in the sensing information in order to determine the sensing information that changes in a range of great values during a specific time period in the obtained sensing information. The sensing information that changes in the range of great values as described above can be used to determine the state (i.e., the life pattern of the user) of the portable terminal.

In step 509, the portable terminal allows the state determination unit 104 to determine a result of an analysis process performed in step 507.

If it is determined in step 509 that there is sensing information that can be used to determine the state of the portable terminal, proceeding to step 511, the portable terminal allows the state determination unit 104 to store the sensing information that can be used to determine the state of the portable terminal. In this case, the state determination unit 104 can store the sensing information in an internal memory of the state determination unit 104 or the memory 106 of the portable terminal. If the state determination unit 104 stores the sensing information in the internal memory, the stored sensing information can be provided to the application processor 102 by using a pre-defined protocol (e.g., UART, I2C, memory interface, etc.) before the state determination unit 104 enters the sleep mode.

In step 513, the portable terminal allows the state determination unit 104 to determine the state of the portable terminal. In step 515, the portable terminal allows the state determination unit 104 to determine the result of step 513. In this case, the state determination unit 104 can determine the state of the portable terminal by determining occurrence of a situation where the application processor 102 wakes up.

If it is determined in step 515 that the situation where the application processor 102 wakes up does not occur, the portable terminal allows the state determination unit 104 to re-perform step 513.

Otherwise, if it is determined in step 515 that the situation where the application processor 102 wakes up does not occur, proceeding to step 517, the portable terminal allows the application processor 102 to wake up. In step 519, the portable terminal allows the woken-up application processor 102 to store sensing information required to recognize the state of the portable terminal in the memory, and thereafter uses the stored information to determine the life pattern of the user of the portable terminal. If the state determination unit 104 stores the sensing information in the memory 106 in step 511, step 519 is skipped.

Additionally, if it is determined in step 509 that the sensing information that can be used to determine the state of the portable terminal does not exist, step 511 is skipped and step 513 is performed.

FIG. 6 is a flowchart illustrating a process of obtaining sensing information required to determine a state (or a life pattern of a user) of a portable terminal by a state determination unit according to another exemplary embodiment of the present invention.

Referring to FIG. 6, the state determination unit 104 wakes up in step 601, and then proceeding to step 603, controls the application processor 102 to enter a sleep mode. Such a situation may be a case where the portable terminal enters an idle mode.

The state determination unit 104 allows the sensor 101 to operate in step 605, and allows the sensor 101 to obtain the sensing information in step 607.

In step 609, the state determination unit 104 determines whether there is a change in the sensing information.

If it is determined in step 609 that the sensing information changes, proceeding to step 611, the state determination unit 104 determines a state of a portable terminal which is moving. In step 613, the state determination unit 104 stores the sensing information. Herein, the state of the portable terminal which is moving is a state in which the portable terminal operates by user's manipulation. When the portable terminal repetitively moves, this operation is in association with the life pattern of the user of the portable terminal.

Thereafter, the state determination unit 104 repeats the operation of step 607 to obtain sensing information required to analyze the life pattern of the user of the portable terminal.

Otherwise, if it is determined in step 609 that the sensing information does not change, proceeding to step 615, the state determination unit 104 determines a state of the portable terminal which is not moving. In step 617, the state determination unit 104 stops to store the sensing information.

In step 619, the state determination unit 104 determines whether the sensing information is stored in an internal memory of the state determination unit 104.

If it is determined in step 619 that the sensing information is stored in the memory 106 of the portable terminal instead of the internal memory, the procedure of FIG. 6 ends.

Otherwise, if it is determined in step 619 that the sensing information is stored in the internal memory of the state determination unit 104, proceeding to step 621, the state determination unit 104 reports the existence of the stored sensing information to the application processor 102 before entering a sleep mode, and thereafter transmits the stored sensing information to the application processor 102. In this case, the state determination unit 104 can delete the sensing information transmitted to the application processor 102 so as to ensure a storage space.

Thereafter, the procedure of FIG. 6 ends.

FIG. 7 is a flowchart illustrating a process of determining a state (or a life pattern of a user) of a portable terminal by an application processor according to another exemplary embodiment of the present invention.

Referring to FIG. 7, the application processor 102 wakes up in step 701 when the portable terminal escapes from an idle state. In step 703, the application processor 102 determines whether sensing information stored by the state determination unit 104 exists. In this case, if the state determination unit 104 stores sensing information in its internal memory, the state determination unit 104 transmits information indicating the existence of the stored sensing information to the application processor 102 before entering a sleep mode.

If it is determined in step 703 that the sensing information stored by the state determination unit 104 exists, proceeding to step 705, the application processor 102 receives the sensing information from the state determination unit 104. In step 707, the application processor 102 stores the sensing information received from the state determination unit 104 in the internal memory 106 of the portable terminal. That is, the application processor 102 may move the sensing information stored in the memory of the state determination unit 104 to the internal memory 106 of the portable terminal so as to periodically determine the life pattern of the user of the portable terminal. The state determination unit 104 and the application processor 102 may exchange the sensing information by using a pre-defined protocol (i.e., UART, I2C, memory interface, etc.).

In step 709, the application processor 102 analyzes the life pattern of the user of the portable terminal by using the pre-stored sensing information. If the application processor 102 determines in step 703 that there is no sensing information stored by the state determination unit 104 (i.e., if the state determination unit 104 directly stores the sensing information in the internal memory 106 of the portable terminal instead of its own memory), the procedure proceeds to step 709.

In step 711, the application processor 102 performs an operation corresponding to the life pattern of the user. Then, the procedure of FIG. 7 ends.

The following operations can be performed by a portable terminal for determining a life pattern according to another exemplary embodiment of the present invention. First, if the portable terminal does not operate for a specific time duration and thus enters an idle state, the application processor 102 enters a sleep state and thus does not control respective modules. Additionally, when the portable terminal enters the idle state, the state determination unit 104 wakes up and obtains sensing information by using a sensor so as to examine a change in the sensing information. Of course, in a case where the state determination unit 104 allows the application processor 102 in the sleep state to wake up by using the sensing information, the state determination unit 104 enters the sleep state and thereafter allows the application processor 102 to wake up.

In a case where a value of the sensing information changes significantly and thus it is determined as sensing information that can be used to determine the life pattern of the user of the portable terminal even though the state determination unit 104 does not allow the application processor 102 to wake up, the sensing information is stored so that the stored sensing information is used when the life pattern is determined.

For example, if the state determination unit 104 determines that a value of an acceleration sensor changes significantly and that a Global Positioning System (GPS) position changes persistently, the state determination unit 104 determines the life pattern indicating a movement of the user and periodically stores location/speed/time data. In this case, if the value of the acceleration sensor does no longed change, the state determination unit 104 determines the life pattern as the user does not move, and stops to store the data.

The application processor 102 analyzes the stored data so as to be able to determine a life pattern indicating a specific pattern frequently used by the user. After analyzing the life pattern, the application processor 102 can receive in advance traffic information of a path which is expected to be used by the user to go to work.

Additionally, when the application processor 102 analyzes data obtained by receiving a telephone call on a bus way home, and recognizes information indicating that the user is on way home, then the application processor 102 can perform tasks such as opening a garage door and operating a boiler by using home networking according to an expected time of arrival.

According to exemplary embodiments of the present invention, an apparatus and method for reducing power consumption generated in an idle state in order to solve a power consumption problem in a portable terminal are provided. When the portable terminal enters the idle state, a state determination unit using low power is allowed to determine a state of the portable terminal and thereafter an application processor is allowed to wake up, so as to solve the conventional power consumption problem that occurs when the portable terminal is in the idle state.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An electronic device comprising:
   a memory;
   a first processor; and
   a second processor configured to at least:
      control to operate, while the first processor is in a sleep state, a sensor of the electronic device to continually obtain motion information of the electronic device, and
      control to write the continually obtained motion information in the memory for processing by the first processor,
   wherein the first processor is configured to read the written motion information from the memory based on the first processor being awakened, and to provide activity information for a user of the electronic device by processing the read motion information.

2. The electronic device of claim 1, wherein the sensor comprises one of an acceleration sensor and a gyro sensor.

3. The electronic device of claim 1, wherein the first processor is further configured to control to perform an operation corresponding to the activity information.

4. The electronic device of claim 1, wherein the activity information comprises a pattern indicating a movement of the user of the electronic device.

5. The electronic device of claim 1, wherein the activity information for the user comprises activity information of the user while the first processor is in the sleep state.

6. An electronic device comprising:
   a memory;
   a first processor; and
   a second processor configured to at least:
      control to operate a sensor of the electronic device to continually obtain motion information of the electronic device, and
      control to write the continually obtained motion information in the memory for processing by the first processor,
   wherein the first processor is configured to read motion information from the memory based on the first processor being awakened, and to provide activity information for a user of the electronic device by processing the read motion information,
   wherein the motion information read by the first processor is written in the memory while the first processor is in a sleep state.

7. The electronic device of claim 6, wherein the sensor comprises one of an acceleration sensor and a gyro sensor.

8. The electronic device of claim 6, wherein the first processor is further configured to control to perform an operation corresponding to the activity information.

9. The electronic device of claim 6, wherein the activity information comprises a pattern indicating a movement of the user of the electronic device.

10. The electronic device of claim 6, wherein the activity information for the user comprises activity information of the user while the first processor is in the sleep state.

11. An electronic device comprising:
    a memory;
    a first processor configured to at least:
       control to operate, while a second processor of the electronic device is in a sleep state, a sensor of the electronic device to continually obtain motion information of the electronic device, and control to write the continually obtained motion information in the memory for processing by the second processor; and the second processor configured to at least:
control to read the written motion information from the memory based on the second processor being awakened, and
control to provide activity information for a user of the electronic device by processing the read motion information.

12. The electronic device of claim 11, wherein the sensor comprises one of an acceleration sensor and a gyro sensor.

13. The electronic device of claim 11, wherein the second processor is further configured to control to perform an operation corresponding to the activity information.

14. The electronic device of claim 11, wherein the activity information comprises a pattern indicating a movement of the user of the electronic device.

15. A method of an electronic device, comprising:
controlling, at a first processor of the electronic device, to continually operate, while a second processor of the electronic device is in a sleep state, a sensor of the electronic device to continually obtain motion information of the electronic device;
controlling, at the first processor, to write the continually obtained motion information in a memory for processing by the second processor;
controlling, at the second processor, to read the written motion information based on the second processor being awakened; and
controlling, at the second processor, to provide activity information for a user of the electronic device by processing the read motion information.

16. The method of claim 15, wherein the sensor comprises one of an acceleration sensor and a gyro sensor.

17. The method of claim 15, further comprising:
controlling, at the second processor, to perform an operation corresponding to the activity information.

18. The method of claim 15, wherein the activity information comprises a pattern indicating a movement of the user of the electronic device.

* * * * *